(12) United States Patent
Fox et al.

(10) Patent No.: US 10,348,504 B2
(45) Date of Patent: Jul. 9, 2019

(54) SYSTEMS AND METHODS FOR SECURE REMOTE IDENTITY VERIFICATION

(71) Applicant: Capital One Services, LLC, McLean, VA (US)

(72) Inventors: Ryan Fox, Lebanon, OH (US); Jonathan Weimer, Henrico, VA (US); Meghnath Sharma, Chantilly, VA (US); Charles W. Hall, Manakin-Sabot, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/896,038

(22) Filed: Feb. 13, 2018

(65) Prior Publication Data

US 2018/0183599 A1 Jun. 28, 2018

Related U.S. Application Data (63) Continuation of application No. 15/642,259, filed on Jul. 5, 2017.
(60) Provisional application No. 62/358,535, filed on Jul. 5, 2016.

(51) Int. Cl.
*H04L 9/06* (2006.01)
*H04L 9/32* (2006.01)
*H04L 9/14* (2006.01)

(52) U.S. Cl.
CPC .......... *H04L 9/3236* (2013.01); *H04L 9/0643* (2013.01); *H04L 9/14* (2013.01); *H04L 2463/082* (2013.01)

(58) Field of Classification Search
CPC ........ H04L 9/3236; H04L 9/0643; H04L 9/14
See application file for complete search history.

(56) References Cited

U.S. PATENT DOCUMENTS

| 7,961,873 B2 | 6/2011 | Ibrahim |
| 8,543,828 B2 | 9/2013 | Albisu |
| 9,622,068 B2 | 4/2017 | Mijar et al. |
| 2005/0166263 A1* | 7/2005 | Nanopoulos ............ G06F 21/31 726/7 |

(Continued)

OTHER PUBLICATIONS

Ferrara (Properly Salting Passwords, The Case Against Pepper, Apr. 17, 2012, 11 pages) (Year: 2011).*

(Continued)

*Primary Examiner* — Oleg Korsak
(74) *Attorney, Agent, or Firm* — Finnegan, Henderson, Farabow, Garrett & Dunner, LLP (57) ABSTRACT

Systems and methods are provided for authenticating an identity of a user requesting a resource or service from an entity. In some embodiments, a system may include at least one processor; and a non-transitory medium containing instructions that cause the system to perform operations. The operations may include receiving credential information associated with the remote user, and receiving, from the server associated with the entity, first hash information. The operations may also include generating second hash information based on information associated with the user, comparing the first hash information with the second hash information, and transmitting an indication based on the comparison to the server associated with the entity.

23 Claims, 7 Drawing Sheets

(56) References Cited

U.S. PATENT DOCUMENTS

2013/0283038 A1    10/2013   Kulkarni et al.
2015/0089621 A1*   3/2015   Khalid .................... H04L 63/08
                                                                                            726/9

OTHER PUBLICATIONS

International Search Report and Written Opinion dated Sep. 11, 2017 for PCT/US2017/040748 filed Jul. 5, 2017 (8 pages).

* cited by examiner

SYSTEMS AND METHODS FOR SECURE REMOTE IDENTITY VERIFICATION

PRIORITY CLAIM

This application is a continuation of U.S. patent application Ser. No. 15/642,259, filed on Jul. 5, 2017 (pending), which claims priority under 35 U.S.C. § 119 to U.S. Provisional Application No. 62/358,535, filed on Jul. 5, 2016, each of which is entitled "Systems and Methods for Secure Remote Identity Verification." The disclosures of the above-referenced applications are expressly incorporated herein by reference in their entireties.

TECHNICAL FIELD

The disclosed embodiments relate to secure remote identity verification in computer networks.

BACKGROUND

Modern computer networks such as the internet have provided numerous opportunities to share information needed to conduct business remotely. While immeasurable efficiencies have been gained by such remote business, new types of fraud and theft have also been created. Each transfer of information via the internet provides additional opportunities for the information to be intercepted by third parties, who may use the information for fraud such as identity theft. In view of the shortcomings of current systems, an improved system and method for remote identity verification is desired.

SUMMARY

Disclosed embodiments provide systems and methods for verifying an identity of a user attempting to remotely access a system or service.

Consistent with a disclosed embodiment, a system for verifying an identity of a user is provided. The system may comprise at least one processor and a non-transitory computer readable medium. The non-transitory computer readable medium may contain instructions, that when executed by the at least one processor, cause the system to perform operations. The operations may include receiving, from a server associated with an entity, a request to authenticate a remote user. The operations may also include transmitting, to a first computer device associated with the remote user, a request for credential information and receiving, from the first computer device, credential information associated with the remote user. The operations may also include transmitting, to the server associated with the entity, information identifying the request and receiving, from the server associated with the entity, first hash information. The operations may also include generating second hash information based on information associated with the user, comparing the first hash information with the second hash information, and transmitting, to the server associated with the entity, an indication based on the comparison.

Consistent with another disclosed embodiment, a system for verifying an identity of a user is provided. The system may comprise at least one processor; and a non-transitory computer readable medium containing instructions, that when executed by the at least one processor, cause the system to perform operations. The operations may include receiving an identity verification request from a device associated with a remote user, the request including information associated with the remote user. The operations may also include requesting, from a server, a transaction identifier for the identity verification request. The operations may also include transmitting, to the device, redirect information for redirecting the device to the server. The operations may also include receiving, from the server, the transaction identifier identifying the identity verification request, hashing the information associated with the remote user, and transmitting the hashed information to the server. The operations may also include receiving from the server, an indication of the authenticity of the user.

Consistent with another disclosed embodiment, a method for verifying an identity of a user is provided. The system may comprise operations performed by at least one processor. The operations may include receiving, from a server associated with an entity, a request to authenticate a remote user. The operations may also include transmitting, to a first computer device associated with the remote user, a request for credential information and receiving, from the first computer device, credential information associated with the remote user. The operations may also include transmitting, to the server associated with the entity, information identifying the request and receiving, from the server associated with the entity, first hash information. The operations may also include generating second hash information based on information associated with the user, comparing the first hash information with the second hash information, and transmitting, to the server associated with the entity, an indication based on the comparison.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

Authentication systems may include methods of verifying a user based on known information related to the user. While such systems may encrypt sensitive information to protect users, they must still exchange this information. These systems may themselves be compromised, enabling theft of the sensitive information. Furthermore, sensitive information previously obtained through theft or fraud may be used to authenticate fraudulent transactions.

In contrast, systems and methods are provided herein for verifying an identity of a user without having to exchange personally identifiable information. In some embodiments, client systems may use the disclosed systems and methods to verify the identity of individuals attempting to access a service or resource. Disclosed embodiments may employ an authenticated event and an authenticated user to match an identity to the user asynchronously.

Figure 1:
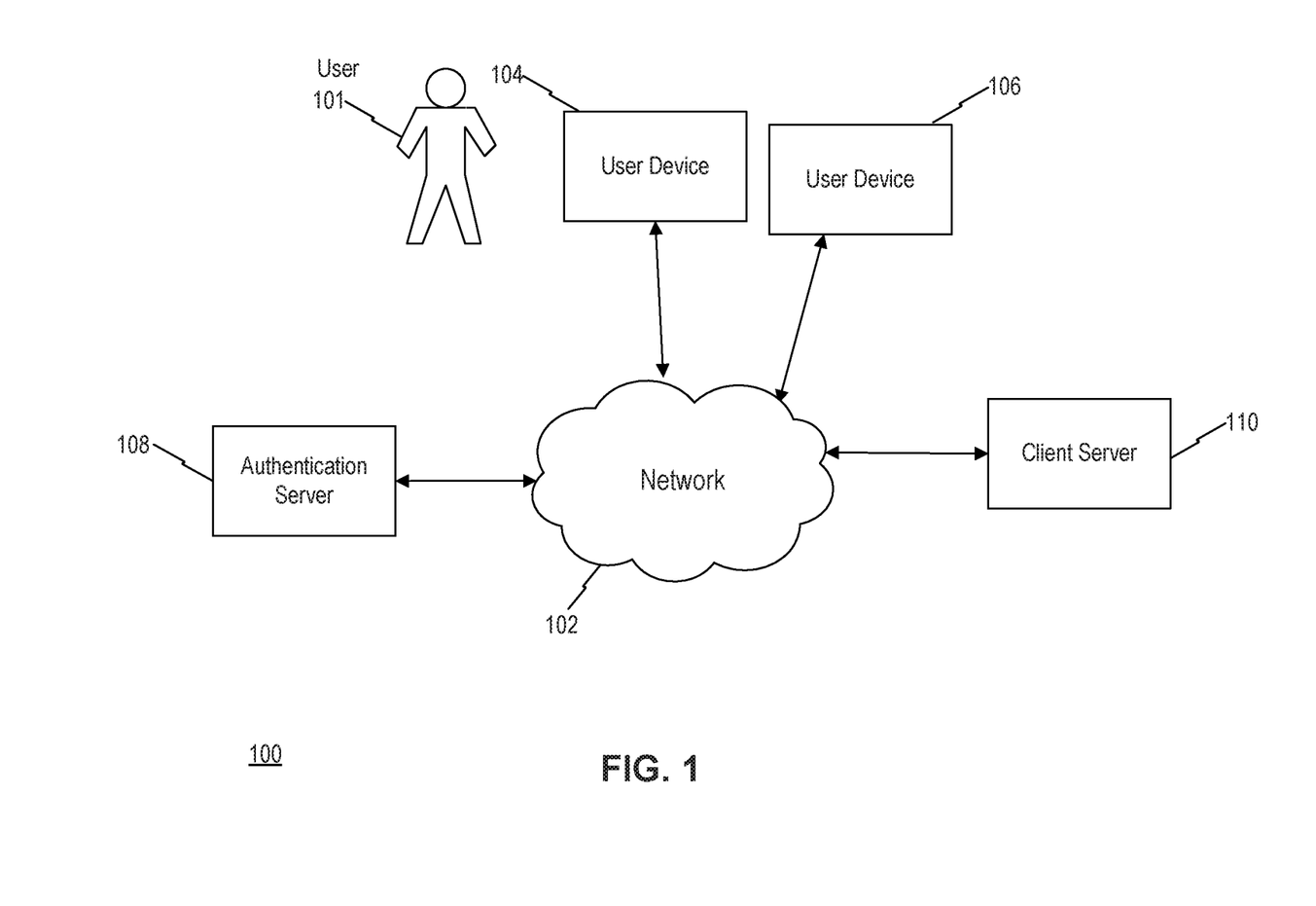
FIG. 1 is a diagram of an exemplary system for verifying an identity of a user, consistent with disclosed embodiments.

FIG. 1 depicts an exemplary system 100 for verifying an identity of a user. In accordance with disclosed embodiments, system 100 may include network 102, user device 104, user device 106, authentication server 108, and client server 110. Other components known to one of ordinary skill in the art may be included in system 100 to gather, process, transmit, receive, and provide information used in conjunction with the disclosed embodiments. The components and arrangements shown in FIG. 1 are not intended to limit the disclosed embodiments, as the components used to implement the disclosed processes and features may vary.

System 100 may be configured to enable client server 110 to rely on authentication server 108 to verify the identity of user 101. In some embodiments, this verification may use sensitive information provided independently to client server 110 and authentication server 108. In some embodiments, client server 110 may be configured to receive information from user 101 as a part of a request for access to a resource or service. Client server 110 may be configured to rely on authentication server 108 to verify the identity of user 101. In some aspects, authentication server 108 may be associated with an entity having an established relationship with user 101. For example, in previous interactions, user 101 may have established identification credentials with the entity. As an additional example, the entity may have previously received sensitive information of user 101. In some aspects, the established credential information and sensitive information may be accessible to authentication server 108. Authentication server 108 may be configured to provide user 101 a secure login using existing credentials and verify the login with a multi-factor authentication event. Client server 110 and authentication server 108 may each be configured to perform coordinated cryptographic hash functions on two sets of information, client server 110 hashing the information submitted as a part of the request and authentication server 108 hashing information existing in established records related to user 101. Authentication server 108 may compare the results of the two hash functions and, if the results match, notify client server 110 that the identity of user 101 has been verified.

Network 102 may comprise any type of computer networking arrangement used to exchange data. For example, network 102 may be the Internet, a private data network, a virtual private network using a public network, and/or other suitable connection(s) that enables system 100 to send and receive information between the components of system 100. Network 102 may also include a public switched telephone network ("PSTN") and/or a wireless network such as a cellular network, WiFi network, or other known wireless network capable of bidirectional data transmission.

User device 104 may comprise a computing device capable of facilitating communication between user 101 and at least one of authentication server 108 and client server 110 (or another server), consistent with disclosed embodiments. In some aspects, user device 104 may comprise at least one of a personal computing device such as, for example, a mobile device with computing ability, a tablet, a smartphone, a wearable device such as Google Glass™ or a smart watch, and a personal computer such as a notebook, laptop, and desktop computer.

User device 106 may comprise at least one of a personal computing device such as, for example, a mobile device with computing ability, a tablet, smartphone, wearable device such as Google™ or smart watches, and a personal computer such as a notebook or desktop computer.

Authentication server 108 may include one or more computer-based systems including computer system components, desktop computers, workstations, tablets, hand held computing devices, memory devices, and/or internal network(s) connecting the components. Authentication server 108 may be owned and/or operated by an entity responsible for issuing and maintaining one or more accounts associated with a user 101. In some embodiments, authentication server 108 may be associated with one or more of a government entity (such as, e.g., a state government or department of motor vehicles), a bank, a credit card company, a credit bureau, a merchant, or any other entity that may issue and maintain one or more accounts or otherwise retain information about user 101. In some embodiments, authentication server 108 may store or have access to sensitive information related to user 101 such as personally identifying information (PII) or sensitive personal information (SPI). Such information may include, for example, a social security number, driver's license number, address, phone number, answers to security questions, etc.

Client server 110 may be owned, operated, and/or associated with a third-party entity different from that of authentication server 108 and may be associated with any entity interacting remotely with user 101 over network 102. Client server 110 may be involved in one or ore transactions initiated by user 101 using a device such as user device 104 or 106. For example, client server 110 may be associated with a merchant, vendor, healthcare organization, telecom organization, financial institution, or an online bank.

System 100 may include one or more databases (not show in figures) that include one or more memory devices that store data and instructions used to perform one or more features of the disclosed embodiments. In some aspects, the database(s) may include any combination of one or more databases controlled by memory controller devices (e.g., server(s), etc.) or software, such as document management systems, Microsoft SQL databases, SharePoint databases, Oracle™ databases, Sybase™ databases, or other relational databases. In some embodiments, the database(s) may comprise an associative array architecture, such as a key-value storage, for storing and rapidly retrieving large amounts of information about an individual. In some embodiments, the database(s) may be configured to store information associated with at least one of user device 104, user device 106 and user 101. For example, the database(s) may be configured to store at least one of PII and SPI associated with user 101.

Figure 2:
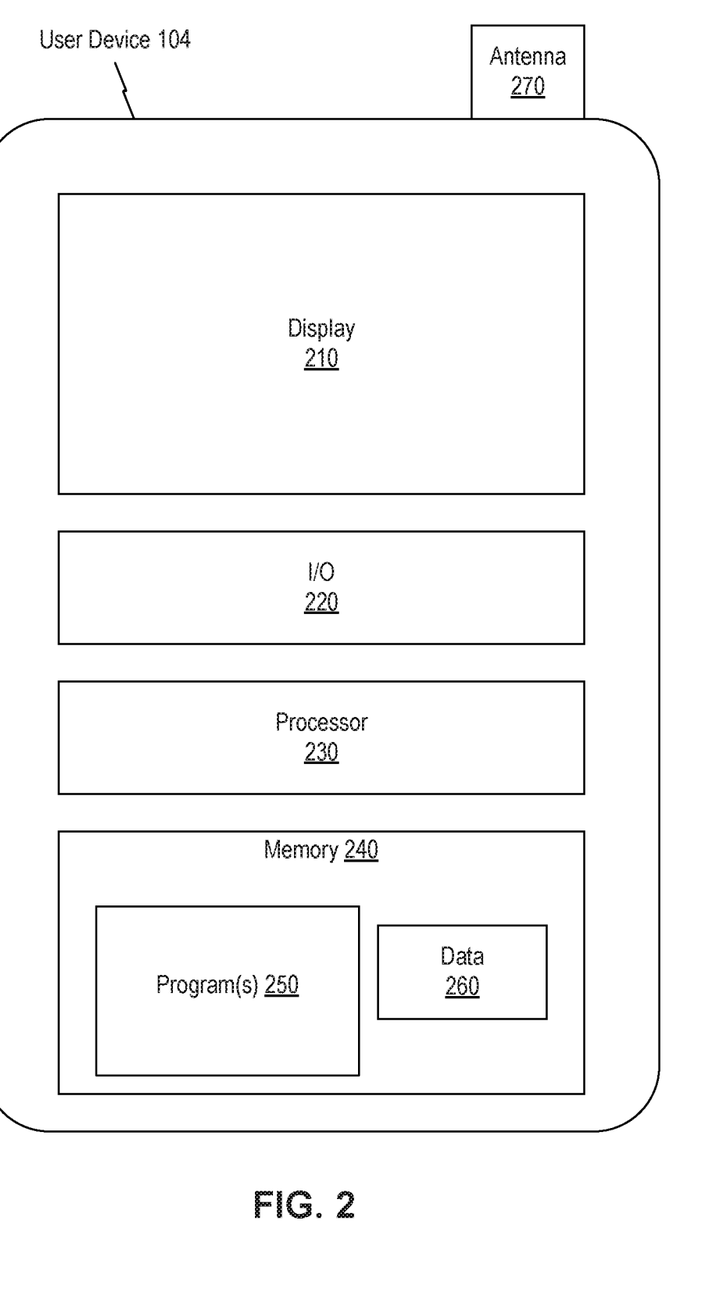
FIG. 2 is a diagram of a user device, consistent with disclosed embodiments.

FIG. 2 shows a diagram of an exemplary user device 104, consistent with disclosed embodiments. In some embodiments, user device 104 may include at least one of display 210, input/output ("I/O") devices 220, one or more processors 230, memory 240, and antenna 270. In some aspects, memory 240 may be configured to store data 260 and one or more programs 250. In some embodiments, user device 106 may comprise any of the components of user device 104, and may comprise the same or similar components to those of user device 104.

Display 210 may include one or more LED indicator lights, a segmented LED display, an LCD screen, an Organic LED (©LED) screen, or any other type of display capable of providing information.

I/O devices 220 may include one or more devices that allow user device 104 to receive input from user 101 and provide feedback to user 101. I/O devices 220 may include, for example, one or more keyboards, mouse devices, buttons, switches, speakers, microphones, or touchscreen panels. In some embodiments, I/O devices 220 may be manipulated by user 101 to input information into user device 104. For example, when user device 104 is a smartphone, I/O devices 220 may include physical buttons on the smartphone, a microphone, a speaker, touchscreen, camera, or sensor.

Processor 230 may comprise a central processing unit (CPU), graphical processing unit (GPU), or similar microprocessor having one or more processing cores. Processor 230 may comprise one or more known processing devices, such as a microprocessor from the Pentium™ family manufactured by Intel™ or the Turion™ family manufactured by AMD™. Processor 230 may constitute a single core or multiple core processors that executes parallel processes simultaneously. For example, processor 230 may be a single core processor configured with virtual processing technologies. In certain embodiments, processor 230 may use logical processors to simultaneously execute and control multiple processes. Processor 230 may implement virtual machine technologies, or other known technologies to provide the ability to execute, control, run, manipulate, store, etc. multiple software processes, applications, programs, etc. In another embodiment, processor 230 may include a multiple-core processor arrangement (e.g., dual, quad core, etc.) configured to provide parallel processing functionalities to allow user device 104 to execute multiple processes simultaneously. One of ordinary skill in the art would understand that other types of processor arrangements could be implemented that provide for the capabilities disclosed herein.

Memory 240 may be a volatile or non-volatile, magnetic, semiconductor, tape, optical, removable, non-removable, or other type of storage device or tangible (i.e., non-transitory) computer-readable medium that stores one or more program(s) 250 and data 260.

Program(s) 250 may include operating systems (not shown) that perform known operating system functions when executed by one or more processors. By way of example, the operating systems may include Microsoft Windows™, Unix™, Linux™, Apple™ operating systems, Personal Digital Assistant (FDA) type operating systems, such as Microsoft CE™, or other types of operating systems. Accordingly, disclosed embodiments may operate and function with computer systems running any type of operating system. User device 104 may also include communication software that, when executed by a processor, provides communications with network 102, such as Web browser software, tablet, or smart hand held device networking software, etc. User device 104 may be a device that executes mobile applications for performing operations consistent with disclosed embodiments, such as a tablet or mobile device.

Figure 3:
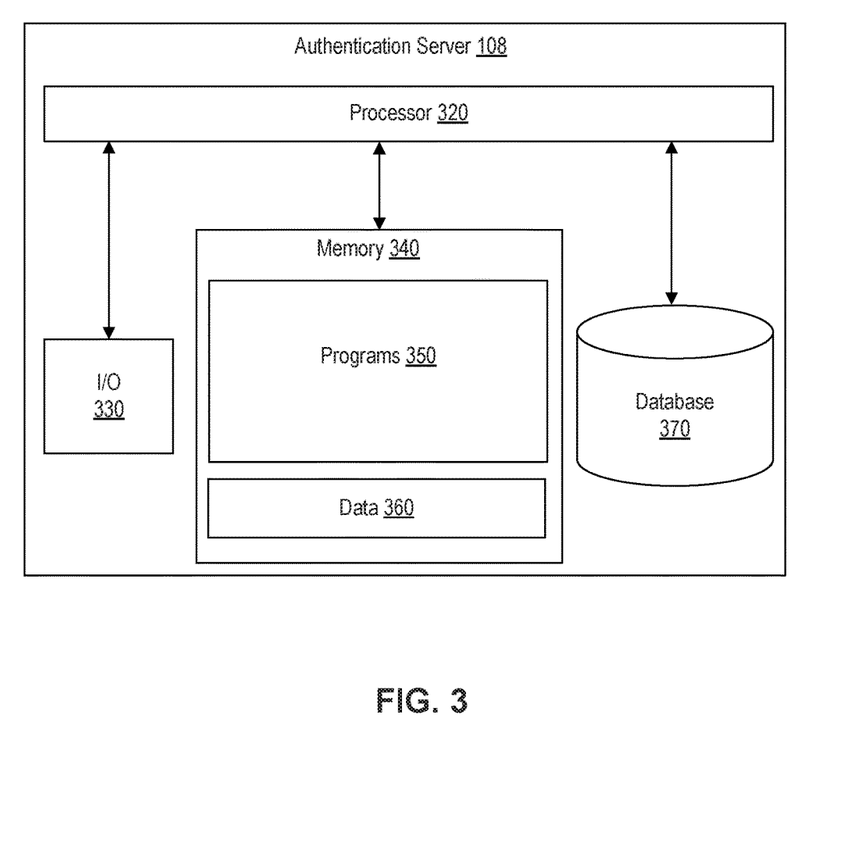
FIG. 3 is a schematic of an exemplary authentication server, consistent with disclosed embodiments.

FIG. 3 is a diagram of an exemplary authentication server 108 consistent with disclosed embodiments. As shown, authentication server 108 may include one or more processor 320, input/output ("I/O") devices 330, memory 340 storing data 360 and programs 350 (including, for example, one or more server app(s) and/or operating system(s)), and a database 370. Authentication server 108 may be a single server or may be configured as a distributed computer system including multiple servers or computers that interoperate to perform one or more of the processes and functionalities associated with the disclosed embodiments.

Processor 320 may be one or more known processing devices, such as a single- or multiple-core processor that executes parallel processes simultaneously. For example, processor 320 may be a single core processor configured with virtual processing technologies. In certain embodiments, processor 320 may use logical processors to simultaneously execute and control multiple processes. Processor 320 may implement virtual machine technologies, or other known technologies to provide the ability to execute, control, run, manipulate, store, etc. multiple software processes, applications, programs, etc. In another embodiment, processor 320 may include a multiple-core processor arrangement (e.g., dual core, quad core, etc.) configured to provide parallel processing functionalities to allow authentication server 108 to execute multiple processes simultaneously. One of ordinary skill in the art would understand that other types of processor arrangements could be implemented that provide for the capabilities disclosed herein.

Authentication server 108 may also include one or more I/O devices 330 that may comprise one or more interfaces for receiving signals or input from devices and providing signals or output to one or more devices that allow data to be received and/or transmitted by authentication server 108. For example, authentication server 108 may include interface components that provide interfaces to one or ore input devices, such as one or more keyboards, mouse devices, and the like, that enable authentication server 108 to receive input from an employee of the entity associated with the server or other operator of authentication server 108.

Authentication server 108 may include one or more storage devices configured to store information used by processor 320 (or other components) to perform certain functions related to the disclosed embodiments. In one example, authentication server 108 may include memory 340 that includes instructions to enable processor 320 to execute one or more applications, such as server applications, network communication processes, and any other type of application or software known to be available on computer systems. Alternatively or additionally, the instructions, application programs, etc. may be stored in an internal database 370 or external storage in communication with authentication server 108, such as a database or other memory accessible over network 102. Database 370 or other external storage may be a volatile or non-volatile, magnetic, semiconductor, tape, optical, removable, non-removable, or other type of storage device or tangible (i.e., non-transitory) computer-readable medium.

In one embodiment, authentication server 108 may include memory 340 that includes instructions that, when executed by processor 320, perform one or more processes consistent with the functionalities disclosed herein. Methods, systems, and articles of manufacture consistent with disclosed embodiments are not limited to separate programs or computers configured to perform dedicated tasks. For example, authentication server 108 may include memory 340 that may include one or more programs 350 to perform one or more functions of the disclosed embodiments. Moreover, processor 320 may execute one or ore programs located remotely from authentication server 108. For example, authentication server 108 may access one or more remote programs, that, when executed, perform functions related to disclosed embodiments.

Programs 350 stored in memory 340 and executed by processor(s) 320 may include one or more server app(s) and/or operating system(s). Server app(s) may incorporate one or more account information apps that cause processor(s) 320 to execute one or more processes related to managing or transmitting information related to user profiles, user account activity, and/or verifying a user identity.

Memory 340 and database 370 may include one or more memory devices that store data and instructions used to perform one or more features of the disclosed embodiments. Memory 340 and database 370 may also include any combination of one or more databases controlled by memory controller devices (e.g., server(s), etc.) or software, such as document management systems, Microsoft SQL databases, Share Point databases, Oracle™ databases, Sybase™ databases, or other relational databases.

Authentication server 108 may also be communicatively connected to one or more remote memory devices (e.g., remote databases (not shown)) through network 102 or a different network. The remote memory devices may be configured to store information and may be accessed and/or managed by authentication server 108. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Client server 110 may include any of the configurations discussed above in relation to FIG. 3 for authentication server 108. In client server 110, however, programs 350 may comprise applications related to a business related to client server 110. For example, if client server 110 is associated with an insurance company, programs 350 may comprise programs related to creating new insurance accounts, accessing account status, managing risk, and/or filing claims.

Figure 4:
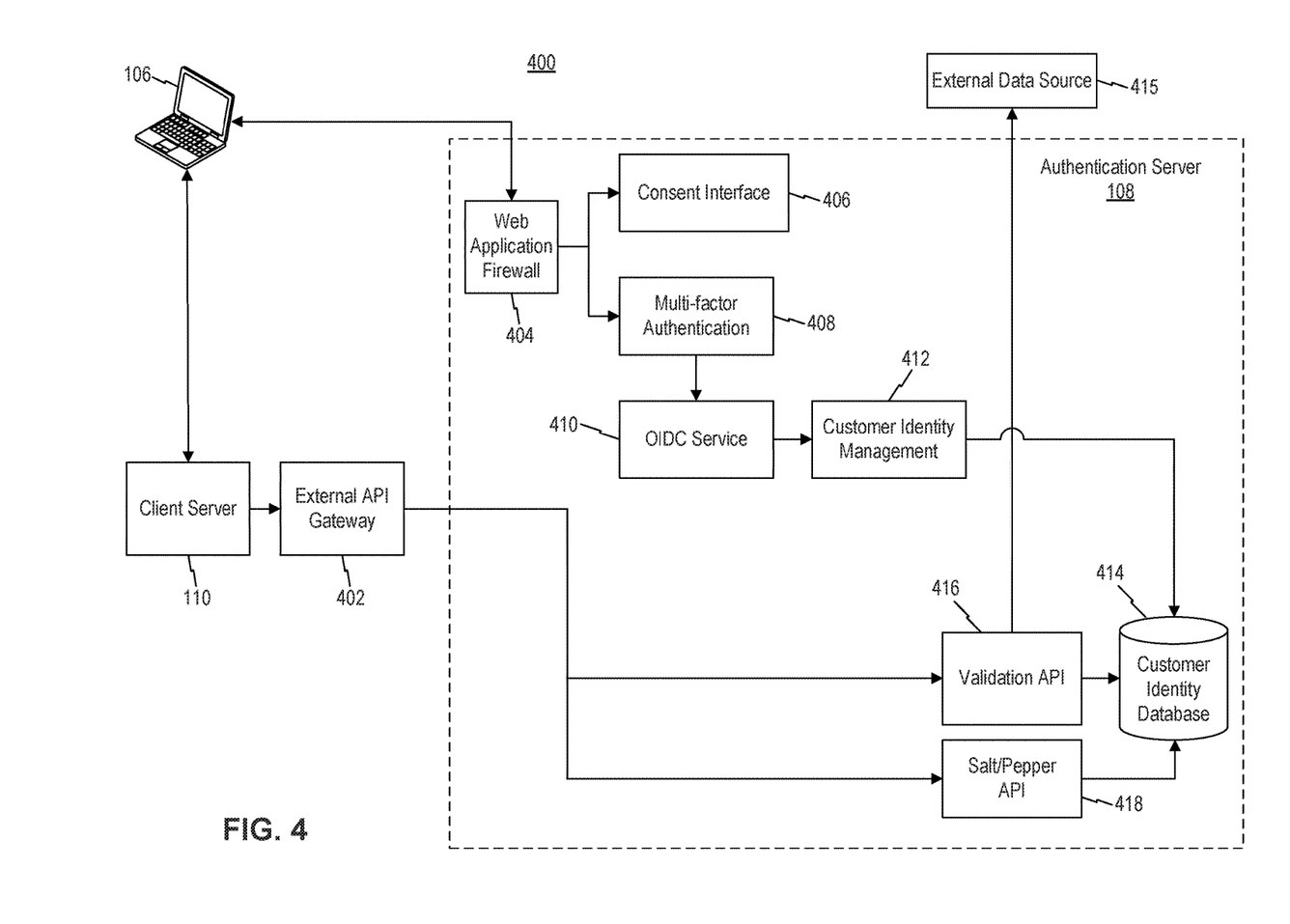
FIG. 4 is a logical depiction of an exemplary authentication server, consistent with disclosed embodiments.

FIG. 4 is a logical depiction of a system 400, including an example of authentication server 108. Authentication Server 108 may include web application firewall 404, consent interface 406, multi-factor authentication 408, OIDC service 410, customer identity management 412, customer identity database 414, validation API 416, and Salt/Pepper API 418. In some embodiments these elements may interact to enable the verification of the identity of user 101 without exchanging personally identifiable information with client system 110 or another system.

User 101 may access an account associated with authentication server 108 via a web browser executed by user device 106. Communications between user device 106 and authentication server 108 may be routed through a web application firewall (WAF) 404 configured to thwart various attacks which could compromise authentication server 108.

Authentication server 108 may also include consent interface software 406. Consent interface 406 may generate warnings and disclaimers that must be acknowledged by user 101 before accessing particular features of authentication server 108. Consent interface 406 may generate custom interfaces based on characteristics of user 101, products or services that user 101 is associated with, or other factors.

Authentication server 108 may include multi-factor authentication software 408. For example, multi-factor authentication software 408 may provide interfaces and interoperability with various systems to require multiple forms of evidence of identity before providing access to a resource. Multi-factor authentication may require two or more of knowledge factors (i.e., "something you know"), possession factors (i.e., "something you have"), and inherence factors (i.e. "something you are"). Knowledge factors may include information intended to be known only by user 101, such as a username and password combination, a personal identification number (PIN) or out of wallet questions either provided by user 101 at an earlier registration or assembled from information related to user 101 available to authentication server 108 but not the general public.

Figure 5A:
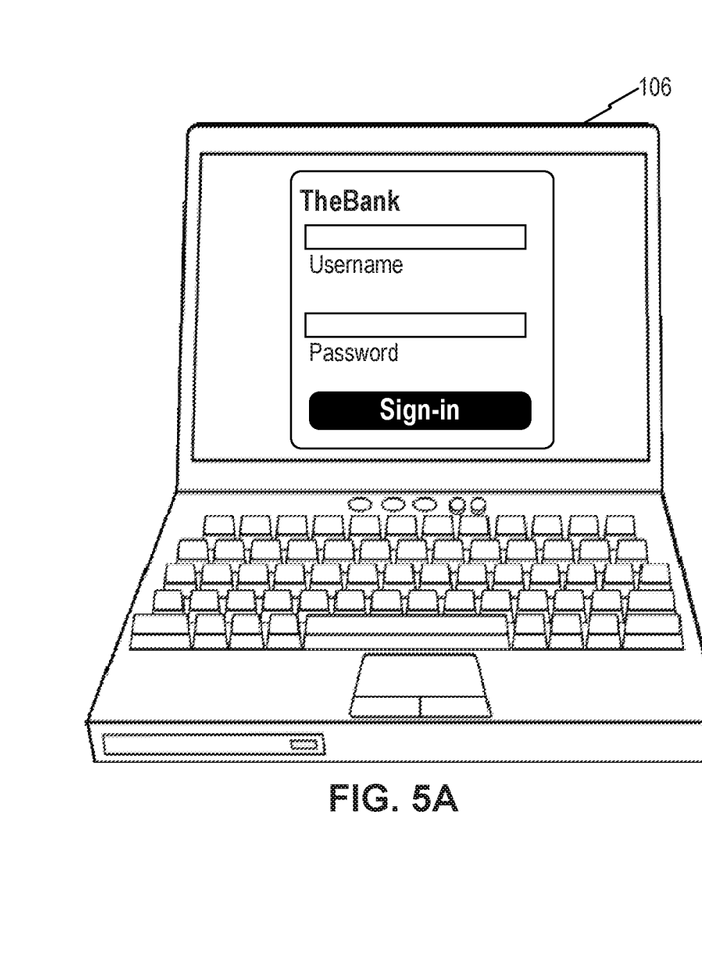
FIGS. 5A and 5B are examples of user interfaces, consistent with disclosed embodiments.
Figure 5B:
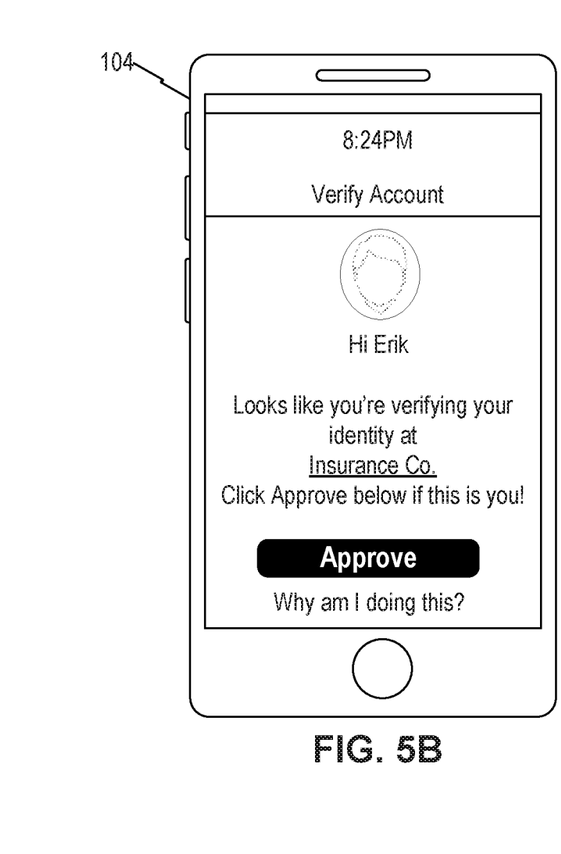

FIG. 5A depicts an example of a username/password prompt displayed via user device 106 as an example of a knowledge factor that may be employed by authentication server 108. Possession factors may include software or hardware tokens such as those marketed by RSA Security LLC, or may be implemented by contacting user 101 via an alternative known means of communication. In some embodiments, the tokens may be time sensitive. For example, as shown in FIG. 5B, after providing a valid username and password via the interface shown in FIG. 5A, a message may be sent to user device 104, requesting approval of the login. This makes user device 104 the possession factor. In other embodiments, other similar communications channels such as email, SMS, or various other forms of electronic messaging may be used as a party of multi-factor authentication software 408.

Authentication sever 108 may also include software implementing an authentication layer such as OpenID Connect (OIDC), for example OIDC service 410. The authentication layer may allow authentication server 108 to manage user accounts and share information related to authenticated users with client servers through secure, standardized channels of communication. The use of OIDC is merely exemplary, and other means of authentication, such as other implementations of OAuth or OAuth 2.0 may be employed alternatively or additionally.

Authentication server 108 may include customer identity management software 412. Customer identity management 412 may be a commercially available or proprietary system for organizing, storing, and/or retrieving customer data and may operate in communication with a customer identity database 414.

Authentication server 108 may include application programming interfaces (APIs) such as validation API 416 and salt/pepper API 418. APIs 416 and 418 are not intended to be limiting, and any number of other APIs may be included in authentication server 108. Client server 110 may call APIs on authentication server 108 using a direct connection via network 102, or may employ external API gateway 402 to provide additional security and isolation. Further, APIs 416 and 418 may operate in isolation from other parts of authentication server 108, such as in a Demilitarized Zone (DMZ) or bastion host. Such isolation may provide protection to authentication server 108 from outside attempts at attack via APIs 416 and 418 and may also protect the data used in APIs 416 and 418 from exposure to any vulnerabilities that may be present within other parts of authentication server 108.

Validation API 416 may receive information related to user 101 and compare the received information with information known to authentication server 108. The results of the comparison may be reported to client server 110 or another entity involved in validating user 101's identity. Validation API 416 may compare information received from client server 110 with information held in customer identity database 414 or an external data source 415. The compared information may include one or more of plaintext, ciphertext, hashed values, or any other form or format of information. External data source 415 may comprise an external database or a third-party server operated by a partner entity such as a credit bureau or public records repository. Examples of validation API 416 are described in greater detail in relation to FIGS. 6 and 8.

Salt/pepper API 418 may provide cryptographic salt and/or pepper to client server 110 that may be used to secure information related to user 101 before providing the information to authentication server 108 via validation API 416. Any form or format of cryptographic salt and/or pepper may be used in various embodiments. Client server may call salt/pepper API 418 to request new salt. In some aspects, salt/pepper API 418 may in response create unique salt for client server 110 and provide the salt along with an identification number identifying the salt and an expiration date for the salt. Authentication server 108 may store a copy of the salt, identification number, and expiration date in a database such as customer identity database 414. In some embodiments, authentication server 108 may be configured to provide pepper in place of or in addition to salt. Other examples of salt/pepper API 418 are described in greater detail in relation to FIG. 7.

Figure 6:
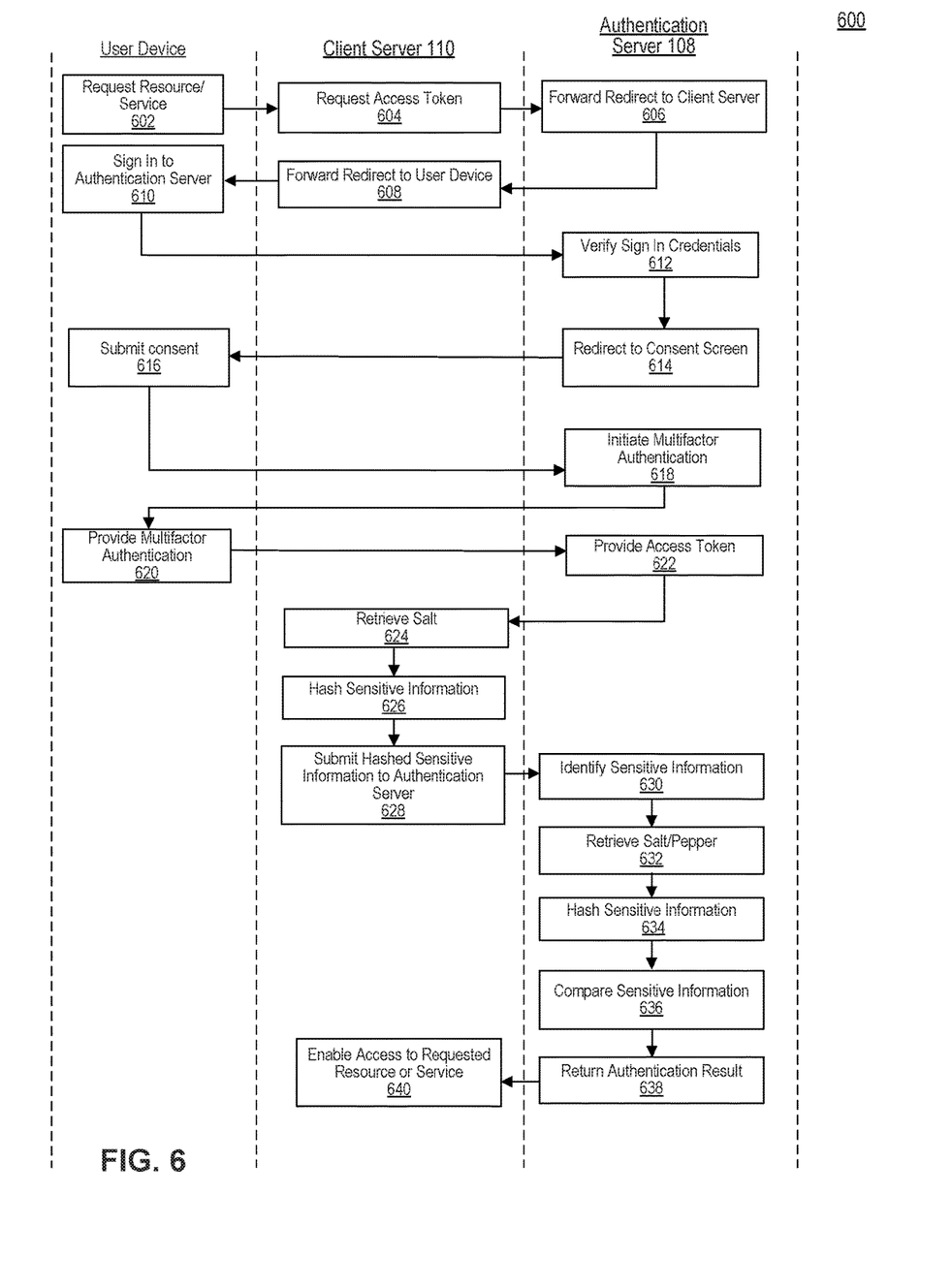
FIG. 6 is a flowchart of an exemplary authentication process, consistent with disclosed embodiments.

FIG. 6 is a flowchart of an exemplary authentication process 600. In some embodiments, process 600 may be carried out such that client server 110 may authenticate the identity of a user via authentication server 108 without transferring sensitive information between servers 110 and 108 in any form that could be converted back to the original sensitive information if intercepted. Process 600 is discussed below as being performed by authentication server 108, client server 110, and user devices 104 and 106. In some embodiments, however, some or all of the steps of process 600 may be performed by other or additional devices, such as, for example, a third-party server, or any other individual or distributed computing systems (not shown in figures). Client server 110 may be configured to redirect identification requests to authentication server 108, or another authentication server in steps 602-608. For example, client server 110 may be configured to receive information submitted by user 101 using a client device (e.g., at least one of client device 104 and 106). Client server 110 may be configured to request verification of the user from authentication server 108, based on the information submitted by user 101. Authentication server 108 may be configured to provide redirection information for redirecting the client device to authentication server 108. Authentication server 108 may be configured to perform a strong authentication event of user 101 in steps 612-622. For example, authentication server 108 may be configured to complete a secure login with multifactor authentication of user 101. Upon successful multifactor authentication, authentication server 108 may be configured to provide an indication of successful authentication to client server 110. Client server 110 may be configured to generate a first cryptographic hash for verifying user 101 in steps 624-628. In some aspects, the first cryptographic hash may depend on information received from a user device (e.g., at least one of user device 104 and 106). In some aspects, the first cryptographic hash may depend on information received from authentication server 108. For example, the first cryptographic hash may depend on at least one of cryptographic keys, a cryptographic salt, and a cryptographic pepper received from authentication server 108. Authentication server 108 may be configured to generate a second cryptographic hash for verifying user 101 in steps 630-634. In some aspects, the second cryptographic hash may depend on information received from user 101. In various aspects, the second cryptographic hash may depend on at least one of cryptographic keys, a cryptographic salt, and a cryptographic pepper stored by authentication server 108, or received by authentication server 108 from another system. Authentication server 108 may be configured to compare the first cryptographic hash and the second cryptographic hash to verify the identity of user 101 in steps 636-640. In some aspects, authentication server 108 may be configured to receive the first cryptographic hash from client server 110, or another system. In various aspects, authentication server 108 may be configured to compare the first cryptographic hash and the second cryptographic hash. In various aspects, authentication server 108 may be configured to provide an indication to the client server 110 based on the result of the comparison. For example, when the first cryptographic hash matches the second cryptographic hash, the authentication server 108 may be configured to provide an indication that user 101 has been verified to client server 110. Client server 110 may be configured to complete a process concerning user 101, provide a service to user 101, or enable user 101 to access to a resource based on this indication. As an additional example, when the first cryptographic hash fails to match the second cryptographic hash, the authentication server 108 may be configured to provide an indication that user 101 has not been verified to client server 110. Client server 110 may be configured to provide to user 101 an indication that user 101 has not been verified. These steps are described in greater detail below.

In step 602, user device 106 may transmit to client server 110 a request to access a resource or service associated with client server 110. The request to access the resource or service may require client server 110 to verify the identity of user 101. For example, user device 106 may access a website associated with client server 110 and request access to a resource or service intended only for user 101 and not for others. Practical examples of such requests are numerous. For example, client server 110 may be associated with an insurance company and user device 106 may submit a request to create a new account associated with user 101 or to access to user 101's claim history. As another example, client server 110 may be associated with a bank and user device 106 may submit a request to establish or to access an account. These examples are not intended to be limiting, as client server 110 may be associated with any of numerous types of entities and may require validation of user 101's identity for any number of reasons. Such verification may require one or more pieces of information that only user 101 is likely to know, such as out of wallet information. This information could include, for example, any of first name, last name, date of birth, social security number (SSN), phone number, personal identification number(s), license number(s), mother's maiden name, answer to a security question, employer information, or other information. Often, this information is sensitive information that must be protected from public disclosure. Client server 110 may provide an option to verify via the entity associated with authentication server 108. In response to this option, user device 106 may send a request to client server 110 to verify the identity of user 101.

At step 604, client server 110 may receive the request from user device 106 and submit to authentication server 108 a request for an access token. The request may conform to an authentication standard such as OAuth, OAuth 2.0, and/or Open ID Connect.

At step 606 authentication server 108 may receive the request from client server 110 and assign it a unique ID, for example a globally unique identifier (GUID). Authentication server 108 may save the unique ID in association with user 101 in customer identity database 414 and transmit to client server 110 instructions to redirect user to authentication server 108. The instructions may include for example, a URL which points to web page associated with authentication server 108. The URL may include the assigned unique ID.

At step 608 client server 110 may associate the unique ID with the pending request and transmit the redirect instructions to user device 106, client server 100 may modify the instructions such that the webpage associated with authentication server 108 is displayed within an interface employed by client server 110. For example, the verification may take place as a part of a registration process with client server 110. In this case, client server 110 may provide a redirect URL to user device 106 such that user device 106 displays the redirected web page in a popup above a registration interface or in a frame within the interface.

At step 610 user device 106 may follow the redirect instructions to communicate with authentication server 108. For example, user device 106 may display a web page presenting user 101 an opportunity to sign in with credentials associated with the entity associated with authentication server 108. An example of such a sign in page is shown in FIG. 5A. In the example of 5A, the interface provides an opportunity for user 101 to sign in using online banking credentials. Upon receiving input from user 101, user device 106 may submit the credentials to authentication server 108.

At step 612 authentication server 108 may verify the credentials received from user device 106. Any means of authenticating the credentials may be used, for example any variant of the OAuth or OAuth 2.0 authentication standards or any other authentication standard.

At step 614, authentication server 108 may redirect user device 106 to a consent interface, for example an interface generated by consent interface 406. At step 616, user device 106 may submit an indication of consent to authentication server 108.

At step 618, authentication server 108 may initiate a multi-factor authentication challenge. The challenge may comprise one or more forms of multi-factor authentication, such as those described in relation to multi-factor authentication software 408. For example, authentication server 108 may send a message to user 101 via a known means of communication with user 101, such as an email address or mobile phone number associated with user 101. The message may request user 101 to reply confirming the identity of user 101. Alternatively, the message may be sent via a mobile application as shown in FIG. 5B. In this example, user device 104 may display an interface identifying the entity involved in the identity verification and inviting user 101 to reply confirming the identity of user 101 (if user 101 did in fact initiate the verification). At step 620, user device 104 may transmit an indication of approval to authentication server 108.

At step 622, authentication server 108 may generate and provide an access token to client server 110. The access token may be any form of information that may facilitate access communication with authentication server 108. For example, the token may be a transaction ID token identifying the particular verification transaction taking place and may be created based on the unique ID stored in customer identity database 414.

At step 624 client server 110 may retrieve cryptographic salt and/or pepper information for use in a hash function. The cryptographic salt/pepper information may be any form or format of data provided to client server 110 by authentication server 108, for example, via salt/pepper API 418 as described in relation to FIG. 4.

At step 626 client server 110 may apply a one-way cryptographic function (i.e., a hash function) to sensitive information collected at step 602. The hash function may be carried out with keys provided to client server 110 by authentication server 108 or otherwise known by authentication server 108. The cryptographic salt and/or pepper retrieved at step 624 may be combined with the sensitive information prior to applying the hash function. Upon completion, the function may output information that cannot reasonably be reverted back to the input sensitive information. Various lengths and formats may be used. For example a separate hash function may be performed for each of date of birth, SSN, and last name resulting in a hashed token for each. Alternatively, client server 110 may perform the hash function on multiple pieces of sensitive information at once.

At step 628, client server 110 may submit the hashed information to authentication server 108. Along with the hashed information, client server 110 may also submit a transaction identification such as the transaction ID token received by client server 110 at step 622. Client server 110 may also submit a token or other indication of which forms of sensitive information are included in the hashed information.

At step 630, authentication server 108 may identify sensitive information associated with the transaction. The sensitive information may be identified by matching a transaction ID token received with the hash information with a token saved in customer identity database 414 associating the transaction with user 101. Authentication server 108 may retrieve corresponding information from customer identity database 414 (or another database). A determination of which categories of information to retrieve may be based on a token or other indication, received from client server 110, indicating which forms of sensitive information are included in the hashed information.

At step 632 authentication server 108 may retrieve cryptographic salt and/or pepper information, from a database such as database 414, for use in a hash function. The salt and/or pepper may be specific to client server 110 and may be the same salt/pepper information used by client server 110 when applying the hashing function to the sensitive information.

At step 634 authentication server 108 may apply a hash function to the sensitive information. The hash function may be the same function used by client server 110 and may be carried out with the same keys and salt and/or pepper.

At step 636 authentication server 108 may compare the two sets of hashed sensitive data. If the same hash function, keys, and salt and/or pepper were used by client server 110 as used by authentication server 108, the result of the comparison may be a match if the sensitive information applied to the hash function was the same as the sensitive information identified by authentication server 108. Thus, a match may verify that the information corresponds to known information related to user 101, without transmitting that information over network 102 in any form that could reasonably be reverted to the original sensitive information.

At step 638 authentication server 108 may transmit a result of the match to client server 110. The transmitted result may be a Boolean (i.e., true or false) result.

At step 640 client server 110 may enable user 101 to access the requested resource or service requested in step 602 via user device 106.

In some embodiments, authentication server may require client servers such as client server 110 to periodically renew salt and/or pepper information. Renewal may prevent potential breach of data security if salt or pepper values are compromised. In such embodiments, authentication server 108 may include an API such as salt/pepper API 418 shown in FIG. 4. Client server 110 may transmit a request over network 102, calling salt/pepper API 418. In response to the request, authentication server 108 may provide new salt and/or pepper information which may include for example, new salt/pepper values, identifying information for the new values, and an expiration date for the new values. Authentication server 108 may also determine whether unexpired salt and/or pepper values exist for the particular client server involved in the request. If such values do exist, authentication server 108 may delete the existing values upon providing the new values to client server 110.

Figure 7:
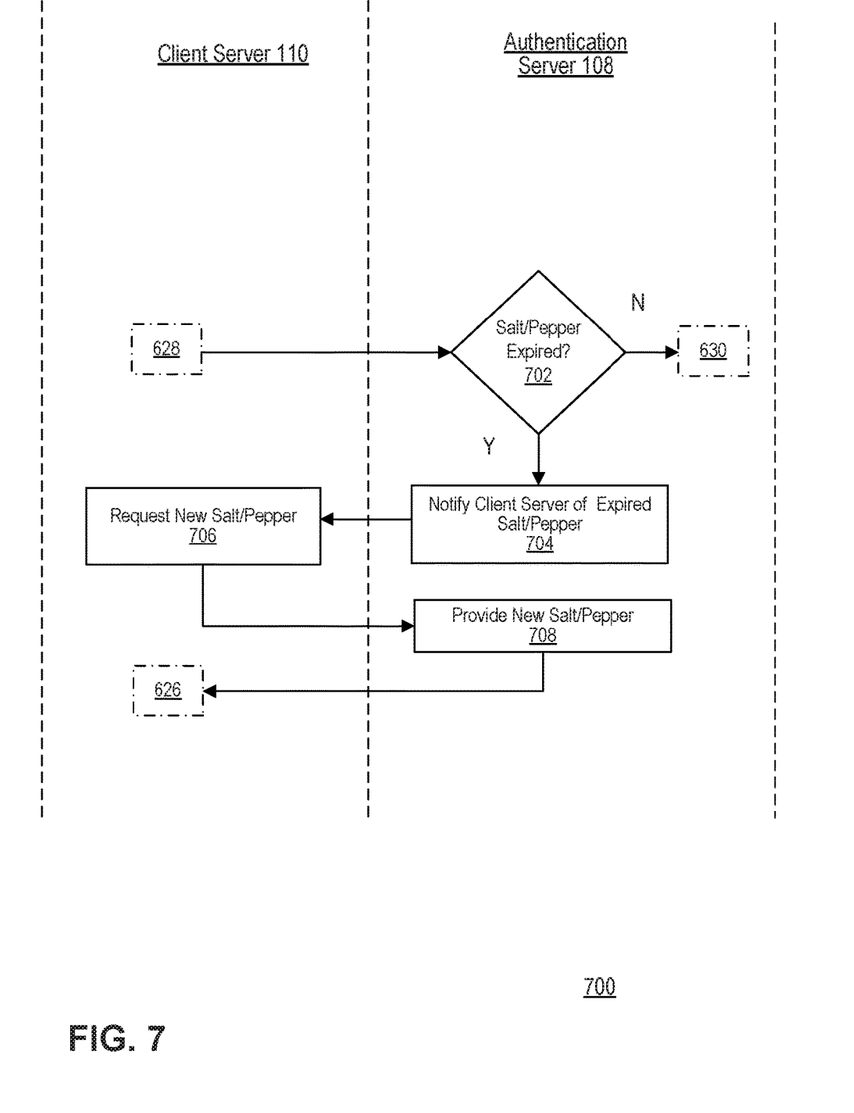
FIG. 7 is a flowchart of an exemplary process for providing new salt and/or pepper information, consistent with disclosed embodiments.

FIG. 7 depicts an exemplary process 700 for providing new salt and/or pepper information to client server 110. In step 702, authentication sever 108 may receive hashed information from client server 110, for example as submitted in step 628 of FIG. 6. Authentication server 108 may determine whether salt and/or pepper information used to hash the received information is expired. For example, authentication server 108 may look up the date of creation of the salt and/or pepper based on an identification number provided along with the hashed information and determine whether the elapsed time since that date exceeds a rule for salt and/or pepper age. Alternatively authentication server 108 may look up an expiration date assigned to the salt and/or pepper at the time of its creation.

If authentication server 108 determines that that the salt and/or pepper used to hash the received information is not expired (step 702; NO) process 700 may pass to step 630 of process 600. If authentication server 108 determines that the salt and/or pepper is expired (step 702; YES) authentication server 108 may pass to step 704 of process 700. At step 704, authentication server 108 may send a message to client server 110, the message indicating that the client server's salt has expired and that the requested authentication cannot be completed.

In step 706, client server 110 may respond to a salt and/or pepper expired indication by calling salt/pepper API 418 with a request for new salt and/or pepper.

In step 708, authentication sever 108 may receive the request via salt/pepper API 418. Authentication server 108 may generate and provide new salt/pepper information to client server 110. After providing the new salt and/or pepper information, process 700 may pass to step 626 of process 600, in which client server 110 may rehash the sensitive information based on newly provided salt/pepper information.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. As an example, hashing sensitive information at client server 110 and authentication server 108 and then matching the information at authentication server 108 may take place before presenting user 101 an opportunity to verify via authentication server 108. The individual steps in this variation may be similar to those described in relation to FIG. 6. Numerous other variations may be apparent to those of skill in the art.

In another example, system 100 may include one or more intermediary servers (not shown in FIG. 1). An intermediary server may, for example, be associated with a provider of verification services. In an embodiment, client server 110 may receive a request (such as described in step 602), requiring verification of the identity of the user 101 associated with the request. Client server 110 may transmit the request for identity verification, via a secure channel, to the intermediary server. The intermediary server may send a request for identity verification, to authentication server 108, at which point the steps of process 600 may resume at step 606. In some embodiments, the intermediary server may send the request to authentication server 108 on a conditional basis. For example, the intermediary server may send the request to authentication server 108 after one or more databases internal or external to the intermediary server (e.g., a credit bureau) are unable to verify user 101. Alternatively, the intermediary server may send the request to multiple authentication servers 108 or may identify that user 101 is a customer of an entity associated with one of a plurality of authentication servers 108, sending the request to the identified authentication server.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software. Further, the described implementations include hardware and software, but systems and methods consistent with the present disclosure can be implemented as hardware alone.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for authenticating the identity of a remote user, the system comprising:
  at least one processor; and
  a non-transitory computer readable medium containing instructions, that when executed by the at least one processor, cause the system to perform operations comprising:
    receiving, from a server associated with an entity, a request to authenticate a remote user, the request including first hash information, and the first hash information including an identification of first cryptographic information used to create the first hash information;
    determining, based on the identification, that the first cryptographic information is expired;
    transmitting, to the server, a first indication of the determination;

receiving, from the server, a request for second cryptographic information, wherein the second cryptographic information depends on a stored cryptographic pepper;

generating the second cryptographic information; and transmitting, to the server, the generated second cryptographic information;

wherein the server includes a validation application programming interface and an application programming interface based on the stored cryptographic pepper, the application programming interface being different from the validation programming interface, both of which serve to protect the server from outside attack.

2. The system of claim 1, wherein the operations further comprise:

receiving, from the server, second hash information, the second hash information including an identification of the generated second cryptographic information;

generating third hash information based on information associated with the user;

comparing the second hash information with the third hash information; and transmitting, to the server associated with the entity, a second indication based on the comparison.

3. The system of claim 2, wherein the second hash information includes an indication of one or more categories of information used to create the second hash information.

4. The system of claim 3, wherein generating the third hash information comprises generating the third hash information based on the indication of one or more categories of information used to create the second hash information.

5. The system of claim 2, wherein generating the third hash information comprises generating the third hash information based on the second cryptographic information.

6. The system of claim 1, wherein the first and second cryptographic information comprise cryptographic salt.

7. The system of claim 1, wherein the first cryptographic information comprises cryptographic pepper.

8. The system of claim 1, wherein the operations further comprise submitting, to a computer device associated with the user, a multi factor authentication challenge.

9. The system of claim 1, wherein the server employs external application programming interface gateway to provide additional security to the server.

10. A method for authenticating the identity of a remote user, the method comprising:

receiving, from a server associated with an entity, a request to authenticate a remote user, the request including first hash information, and the first hash information including an identification of first cryptographic information used to create the first hash information;

determining, based on the identification, that the first cryptographic information is expired;

transmitting, to the server, a first indication of the determination;

receiving, from the server, a request for second cryptographic information, wherein the second cryptographic information depends on a stored cryptographic pepper;

generating the second cryptographic information;

transmitting, to the server, the generated second cryptographic information; and protecting the server from outside attack using both a validation application programming interface and an application programming interface based on the stored cryptographic pepper, the application programming interface being different from the validation programming interface.

11. The method of claim 10, wherein the operations further comprise:

receiving, from the server, second hash information, the second hash information including an identification of the generated second cryptographic information;

generating third hash information based on information associated with the user;

comparing the second hash information with the third hash information; and transmitting, to the server associated with the entity, a second indication based on the comparison.

12. The method of claim 11, wherein the second hash information includes an indication of one or more categories of information used to create the second hash information.

13. The method of claim 12, wherein generating the third hash information comprises generating the third hash information based on the indication of one or more categories of information used to create the second hash information.

14. The method of claim 11, wherein generating the third hash information comprises generating the third hash information based on the second cryptographic information.

15. The method of claim 10, wherein the first and second cryptographic information comprise cryptographic salt.

16. The method of claim 10, wherein the first cryptographic information comprises cryptographic pepper.

17. The method of claim 10, wherein the operations further comprise submitting, to a computer device associated with the user, a multi factor authentication challenge.

18. The method of claim 10, wherein the server employs external application programming interface gateway to provide additional security to the server.

19. A system for authenticating the identity of a remote user, the system comprising:

at least one processor; and a non-transitory computer readable medium containing instructions, that when executed by the at least one processor, cause the system to perform operations comprising:

receiving an identity verification request from a device associated with a remote user, the request including information associated with the remote user;

transmitting, to a server, a request to authenticate the remote user, the request including first hash information, and the first hash information including an identification of first cryptographic information;

receiving, from the server, a first indication that the first cryptographic information is expired;

transmitting, to the server, a request for second cryptographic information, wherein the second cryptographic information depends on a stored cryptographic pepper;

receiving, from the server, second cryptographic information;

generating second hash information based on the second cryptographic information, transmitting the second hash information to the server; and receiving, from the server, a second indication based on the second hash information;

wherein the server includes a validation application programming interface and an application programming interface based on the stored cryptographic pepper, the application programming interface being different from the validation programming interface, both of which serve to protect the server from outside attack.

20. The system of claim 19, wherein the first and second cryptographic information comprise cryptographic salt and the first cryptographic information comprises cryptographic pepper.

21. The system of claim 19, wherein the transmitted first and second hash information include an indication of one or more categories of information used to hash the information.

22. The system of claim 19, wherein the first hash information is based at least in part on the information associated with the remote user.

23. The system of claim 19, wherein the server employs external application programming interface gateway to provide additional security to the server.

* * * * *